United States Patent
Timmer

[11] Patent Number: 5,825,841
[45] Date of Patent: Oct. 20, 1998

[54] CORRECTION FOR RING-LIKE IMAGE ARTEFACTS

[75] Inventor: Jan Timmer, Eindhoven, Netherlands

[73] Assignee: U.S. Philips Corporation, New York, N.Y.

[21] Appl. No.: 895,252

[22] Filed: Jul. 16, 1997

[30] Foreign Application Priority Data

Jul. 30, 1996 [EP] European Pat. Off. .............. 96202151

[51] Int. Cl.[6] ........................................................ A61B 6/03
[52] U.S. Cl. .............................. 378/4; 378/901; 382/131; 382/275
[58] Field of Search ................................. 378/4, 15, 19, 378/401; 382/131, 275

[56] References Cited

U.S. PATENT DOCUMENTS

| | | | |
|---|---|---|---|
| 4,670,840 | 6/1987 | Freundlich | 378/7 |
| 5,229,934 | 7/1993 | Mattson et al. | 600/425 |
| 5,533,081 | 7/1996 | Hsieh | 378/15 |

*Primary Examiner*—David P. Porta
*Assistant Examiner*—David Vernon Bruce
*Attorney, Agent, or Firm*—Jack Slobod; Dwight H. Renfrew

[57] ABSTRACT

A computer tomography device is provided with a reconstruction unit (1) for deriving brightness values of an image from density values. An image processing system (2) for deriving corrected brightness values from the brightness values of the image is arranged to calculate the variation of brightness values of the image in the radial direction and in the tangential direction. The image processing system is also arranged to calculate the deviation between the variation in the radial direction and the variation in the tangential direction and to derive corrected brightness values from brightness values of the image and the deviation.

20 Claims, 3 Drawing Sheets

CORRECTION FOR RING-LIKE IMAGE ARTEFACTS

BACKGROUND OF THE INVENTION

1. Field of the Invention

The invention relates to a computer tomography device which includes a reconstruction unit for deriving brightness values of an image from density values, and an image processing system for deriving corrected brightness values from the brightness values of the image. The invention also relates to an image processing method.

2. Description of Related Art

A computer tomography device of this kind is known from U.S. Pat. No. 4,670,840.

Computer tomography involves inter alia X-rays which emanate from an X-ray source, irradiate an object to be examined, for example a patient to be radiologically examined, and are detected by means of a position-sensitive X-ray detector which extends in space and occupies a substantially fixed position relative to the X-ray source. The X-ray source and the X-ray detector together are arranged in a number of orientations relative to the object to be examined so as to record a number of density distributions. The reconstruction unit derives an image of a slice of the object from the density distributions. Computer tomography is used preferably for forming an image of a slice of the patient in medical diagnostic radiology.

The known computer tomography device includes an image processing system which corrects the image for ring-like artefacts. Such artefacts are caused notably by differences in sensitivities of individual detector cells of the X-ray detector.

SUMMARY OF THE INVENTION

It is an object of the present invention to provide an image processing method with correction of ring-like artefacts which is more accurate than can be achieved in the known device.

This object is achieved by means of an image processing method according to the invention which includes the steps of:

choosing a center in the image, calculating, in one or more points of the image, a variation of brightness values of the image in the radial direction relative to the center, calculating, in one or more points of the image, a variation of brightness values of the image in the tangential direction relative to the center, deriving corrected brightness values from brightness values of the image and a deviation between the variation in the radial direction and the variation in the tangential direction, said deviation essentially not representing image information.

The ring-like artefacts are approximately rotationally symmetrical deviations of the brightness value. The invention utilizes the fact the ring-like artefacts in the image are substantially constant for a fixed distance from a center of rotation of said rotation symmetry and vary mainly for a varying distance from said center of rotation. The invention uses this property so as to derive the artefact from brightness values of the image. The artefact can usually be determined already from a few parts of the image in order to correct the image for ring-like artefacts. This is the case notably when only one or a few rings are involved, because such a ring can be derived from a part of the image in which the ring is most clearly visible. For positions in the image in which ring-like artefacts occur, the corrected brightness values are derived from the respective brightness value in the relevant positions and the artefact determined.

In order to correct the image for ring-like artefacts according to the invention, the center of rotation of said rotation symmetry is chosen as the center. This center need not coincide with the geometrical center of the image. The circumstance in which the image has been formed determine the position of said center in the image. Notably when the relevant image has been formed by X-ray computer tomography, said center corresponds to the center of rotation of the combined rotation of the X-ray source and the X-ray detector. According to the invention, two mutually perpendicular directions are distinguished in the image. In individual positions in the image the radial direction is the direction of the line through said center of the image and the relevant position in the direction towards the edge of the image. In individual positions in the image the tangential direction is the direction along a circle which has the center of the image as its center and extends through the relevant position. The variation of brightness values in the radial direction represents the magnitude of differences between brightness values in positions in the image which are situated on substantially the same line through the center of the image. The variation of brightness values in the tangential direction represents the magnitude of differences between brightness values in positions in the image which are situated at substantially the same distance from the center of the image. Preferably, positions are taken so as to be situated close to one another so that the radial and the tangential variation represent local differences in brightness values in the image. Differences between the radial variation and the tangential variation may relate to image information but also to ring-like artefacts. It has been found that such differences, in as far as they are based on image information and a ring-like artefact, respectively, can be distinguished from one another. This enables a deviation between the variation in the radial direction and the variation in the tangential direction to be derived from brightness values of the image, which deviation represents hardly any image information but mainly the ring-like artefact. Because the deviation represents mainly ring-like artefacts, accurately corrected brightness values can be derived from said deviation and the brightness values. Using said corrected brightness values, a corrected image can be composed which is substantially free from ring-like artefacts but in which substantially all image information of the object to be examined has been preserved. The corrected image has a high diagnostic quality, which means that small details of low contrast can be suitably visualized in the image. The corrected image, therefore, is a valuable diagnostic aid for a physician making a medical diagnosis. In comparison with the known correction method, the method according to the invention requires only a comparatively short calculation time.

A preferred version of an image processing method according to the invention is characterized in that the variation in the radial and/or the tangential direction is derived from a high-frequency component of the image.

Low-frequency components of the image contain mainly slow spatial variations of brightness values in the image. The low-frequency components represent mainly image information relating to comparatively coarse image structures. Ring-like artefacts, such as notably those caused by small sensitivity differences of the detector cells, are present in a high-frequency component of the image. It has been found that suitable high-frequency components represent a resolution with brightness variations in a range of from approximately 4 to 20 line pairs per cm. Suitable low-frequency components represent a resolution with brightness variations in a range of from approximately 1 to 2 line pairs per cm. The high-frequency component is preferably chosen so that it contains fast variations of the brightness values in mainly the radial direction. When the radial and the tangential variation of the brightness values are derived from such a high-frequency component, it is achieved that the deviation derived from the two variations accurately represents such ring-like artefacts.

Because ring-like artefacts contain mainly slow variations in the tangential direction but fast variations in the radial direction, such a high-frequency component in the radial direction is particularly suitable for correction for ring-like artefacts.

A further preferred version of an image processing method according to the invention is characterized in that for positions in the image for which low-frequency components of the variations in the radial and tangential directions are below respective upper limits, said deviation is derived from the variation in the radial direction and the variation in the tangential direction.

Image information is contained mainly in comparatively large brightness variations. For example, in medical images edges of organs or other anatomic structures, such as blood vessels, are associated with comparatively large brightness variations. An image of a catheter introduced into the body of a patient also leads to a comparatively large brightness variation. When the determination of the deviation between the radial and the tangential variation of the brightness values takes into account exclusively positions in the image in which the variation is not excessive over short distances in the image, since it is below the relevant upper limit, it is ensured that the image information is not unduly considered to be an artefact. Suitable values for the upper limits are preferably determined experimentally. It has been found that such suitable values are dependent on the type of image in which ring-like artefacts are to be counteracted.

A further preferred version of an image processing method according to the invention is characterized in that for positions in the image in which the variation in the tangential direction and a low-frequency component of the variation in the radial direction are below respective upper limits said deviation is derived from a high-frequency component of the radial variation.

In parts of the image, preferably small regions in which the low-frequency components of the variation in the radial and the tangential direction are below a relevant upper limit, so not excessively large, locally at the most minor brightness variations occur. Such a small region, therefore, contains hardly any image information. Such regions are preferably so large that they contain a substantial number of pixels, for example some tens of pixels, but they are also much smaller than the dimensions of typical structures in the image. Furthermore, such regions are selected so that the high-frequency component of the tangential variation is only small. It is thus achieved that the high-frequency component of the radial variation represents mainly local brightness variations of a ring-like artefact.

A further preferred version of an image processing method according to the invention is characterized in that said deviation is derived for positions in the image for which the high-frequency component of the radial variation is below a ceiling value.

After all, acute and large brightness variations in the image usually represent image information. Such acute variations concern comparatively large variations of the brightness values over comparatively short distances in the image. For example, in medical images edges of organs or other anatomic structures, such as blood vessels or the wall of the skull, are associated with acute brightness variations. An image of a catheter introduced into the body of a patient also causes an acute brightness variation. If positions in the image with a very high value for the high-frequency component of the radial variation are not taken into account for determining the deviation, it is achieved that the image information is not unduly considered to be an artefact. It is achieved notably that an acute brightness variation in the radial direction in the image, such as a part of the wall of the skull, is not considered to be a ring-like artefact. A suitable ceiling value is preferably found experimentally.

A further preferred version of an image processing method according to the invention is characterized in that said deviation is derived from a value of the high-frequency component of the radial variation which has been averaged over a segment of circle in the tangential direction.

It has been found that ring-like artefacts vary hardly in the tangential direction. By averaging the high-frequency component over a segment of circle in the image, it is achieved that the deviation accurately represents the ring-like artefact and is hardly disturbed by image information. A segment of circle in the image is a part of the image which is situated at a constant, or practically substantially constant, distance from the center and for which a value for the azimuth lies in a preselected range. The segment of circle is thus determined by said distance from the center and the range of the azimuth. It has been found that suitable segments of circle are, for example one quarter, one eighth or one sixteenth part of a circle.

A further preferred version of an image processing method according to the invention is characterized in that the number of positions in the image for which the variation in the radial and tangential directions is below the respective upper limits is compared with a predetermined minimum number.

If there is an insufficient number of positions with a deviation below the upper limit, it is unlikely that ring-like artefacts will occur in the relevant image. Should the number of positions in which the deviation is below the upper limit not be greater than the minimum number, a warning can be issued that image processing is not reliable. It is also feasible, possibly in combination with such a warning, to abstain from further image processing aiming to correct for ring-like artefacts which in all probability will not occur in the relevant image. A suitable minimum value is, for example 20% of the total number of pixels.

A further preferred version of an image processing method according to the invention is characterized in that the derivation of the deviation for individual positions in the image involves an interpolation.

It has been found that it suffices to derive the deviation for a limited number of positions in the image from the local radial and tangential variation of the brightness values. The deviation for the other positions in the image can be calculated by interpolation between values of the deviation determined for positions in the vicinity. Because a complete calculation of the deviation from the variations of brightness values in both directions is required only for a limited number of positions in the image, correction of the image for ring-like artefacts is not very time-consuming. It has been found in practice that such a complete calculation is required for only a small percentage of the total number of pixels. The correction of the entire image of, for example 512×512 pixels for the ring-like artefacts does not require more than approximately 100 ms, being no more than a few per cent of the calculation time required for reconstructing the image from the density distribution.

A further preferred version of an image processing method according to the invention is characterized in that the derivation of the deviation involves low-frequency filtering of values of said deviation in the tangential direction.

The central part of the image is a part which is situated at a comparatively short distance from the center of the image. When an image is available as a square matrix of pixels in cartesian coordinates, a given image sector in the central part of the image, in which the value of the azimuth is in a given interval, will have fewer pixels as these pixels are situated nearer to the center. Such a distribution of pixels across the image in the central part thereof gives rise to notably high-frequency brightness variations in the tangential direction which do not relate to image information or ring-like artefacts. Disturbances of the deviation are counteracted by applying, in the central part of the image, low-frequency filtering in the tangential direction of values of the deviation with which the interpolation is performed. Preferably, low-frequency filtering is performed in the tangential direction of the high-frequency component of the radial variation. This precludes over-sensitivity to brightness variations not relating to ring-like artefacts.

The method according to the invention is particularly suitable for counteracting ring-like artefacts in images obtained by means of computer tomography. Notably small differences between the sensitivities of the detector cells in a computer tomography device cause such ring-like artefacts. It is to be noted, however, that the method according to the invention is also suitable for the correction of images for ring-like artefacts, irrespective of how these images have been formed.

It is a further object of the invention to provide a computer tomography device which is suitable to carry out the method according to the invention.

This further object is achieved by means of a computer tomography device which includes a reconstruction unit for deriving brightness values of an image from density values and an image processing system for deriving corrected brightness values from the brightness values of the image and is characterized in that the image processing system is arranged to
choose a center in the image
calculate, in one or more points of the image, a variation of brightness values of the image in the radial direction relative to the center,
calculate, in one or more points of the image, a variation of brightness values of the image in the tangential direction relative to the center,
derive corrected brightness values from brightness values of the image and a deviation between the variation in the radial direction and the variation in the tangential direction,
said deviation essentially not representing image information A contemporary computer tomography system preferably utilizes an X-ray detector provided with solid-state detector calls. It has been found that differences, be it small, occur between the sensitivities of the individual detector cells, which differences cause ring-like artefacts in the image, that is to say ring-like deviations of the brightness value. It has been found that the image processing system of the computer tomography system according to the invention is capable of correcting the image for ring-like artefacts caused by small differences between the sensivities of detector cells.

Advantageous embodiments of a computer tomography device according to the invention are defined in the dependent claims 11 and 12. The image processing system is advantageously engineered as a suitably programmed computer or a (micro) processor with specially designed hardware circuits.

BRIEF DESCRIPTION OF THE DRAWINGS

These and other aspects of the invention will be explained in detail hereinafter with reference to the following embodiments and the accompanying drawing; therein.

DETAILED DESCRIPTION OF THE PREFERRED EMBODIMENTS

Figure 1:
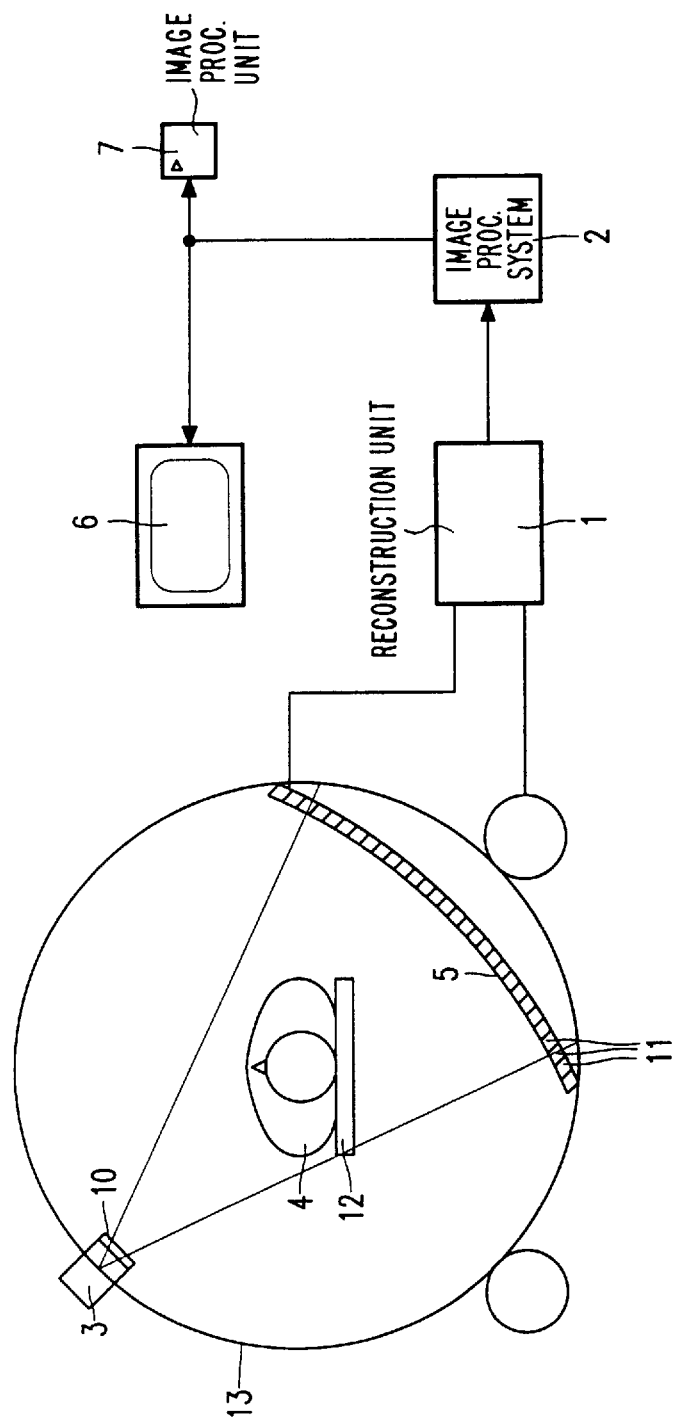
FIG. 1 shows diagrammatically a computer tomography device in which the invention is used.

FIG. 1 shows diagrammatically a computer tomography device in which the invention is used. Via a slit-shaped diaphragm 10, an X-ray source 3 emits a diverging flat (fan-shaped) X-ray beam so as to irradiate the object 4, for example a patient to be examined. The X-ray detector 5 is arranged so as to face the X-ray source 3. The X-ray detector of the present embodiment is a position-sensitive X-ray detector which includes an array of individual detector cells 11. The detector cells 11 are, for example gas-filled (xenon) detectors or solid-state detectors. The thickness of the fan-shaped X-ray beam generally is between 1 mm and 10 mm, measured halfway between the X-ray source and the X-ray detector. The intensity of the radiation which has passed the patient and is incident on the X-ray detector is determined mainly by the absorption within the patient 4 who is arranged on a table 12 between the X-ray source and the X-ray detector. The X-ray absorption is measured in a large number of directions along a large number of lines by rotating the X-ray source 3 and the X-ray detector 5 together around the patient by means of a carrier frame 13. The combined rotation of the X-ray source and the X-ray detector may be continuous but also intermittent. Furthermore, during irradiation and rotation the patient can be displaced along the axis of rotation, so that the X-ray detector acquires data from a significant three-dimensional volume of the patient. Besides a rotatable system of an X-ray source and an X-ray detector, the computer tomography device may also have a detection system which is not rotatable but extends (substantially) completely around the patient. Generally speaking, the X-ray source and the X-ray detector are together rotated completely around the patient, so through 360°. Alternatively, a detection system can be arranged around the entire circumference of the patient, in which case the X-ray source is rotated completely around the patient. Furthermore, use can also be made of an X-ray source in the form of a ring-shaped anode which is arranged around the patient, the target of an electron beam whereby X-rays are generated from the anode material then moving along the ring-shaped anode around the patient. However, it suffices in principle to utilize a fan-shaped beam which rotates around the patient through an angle which amounts to the sum of 180° and the angle of aperture of the fan-shaped beam.

In each position or orientation of the X-ray source and the X-ray detector the intensity of the X-rays received by the individual detector cells 11 is digitized and applied to the reconstruction unit 1. The reconstruction unit 1 derives an image of the slice of the patient to be examined from this measuring data. The reconstruction unit 1 is arranged to correct the measuring data at least partly for known sources of errors and artefacts. For example, high and low brightness values in the image correspond to parts of the patient in which the X-rays are strongly and weakly absorbed, respectively. Such an image can be displayed on a monitor 6 coupled to the reconstruction unit. The image may also be stored as a digital image matrix or be applied to an image processing unit 7 for further processing.

Small differences in the sensitivity of the individual detector cells 11 cause ring-like artefacts in the image produced by the reconstruction unit 1. It has been found that even relative sensitivity differences of only $10^{-4}$ already give rise to clearly visible artefacts in the image if no further steps are taken. The computer tomography device according to the invention includes an image processing system 2 which is arranged to correct the image for such ring-like artefacts.

Figure 2:
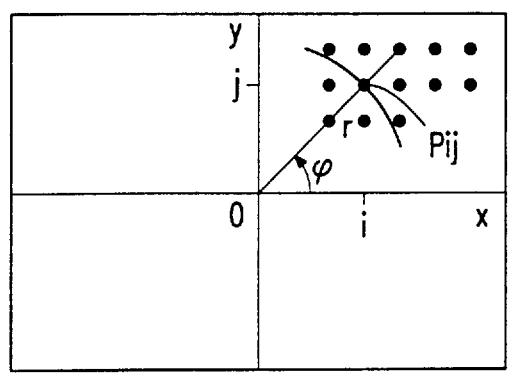
FIG. 2 shows graphically the radial and tangential directions in the image.
Figure 3:
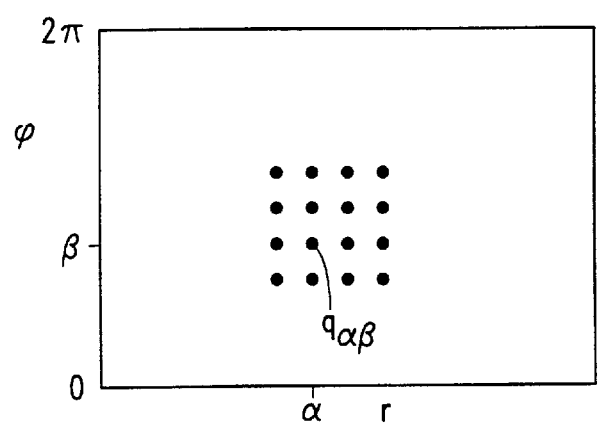
FIG. 3 shows graphically the arrangement of brightness values as a function of the radial and tangential positions in the image.

FIG. 2 shows graphically the radial and tangential directions in the image. The image contains a large number of, for example 512×512 pixels whose positions are given by the cartesian coordinates (i,j). With each of these pixels there is associated a brightness value $P_{ij}$. The radial direction in a pixel (i,j) is the direction along the radius from the origin O(0,0) of the coordinate system. Because ring-like artefacts usually occur as undesirable concentric circles in the image, it is handy to situate the origin of the coordinate system at the common center of these circles in the image. In each pixel is the tangential direction the direction in which the azimuth $\phi$ increases at constant radius r. Instead of using cartesian coordinates, positions (x=i, y=j) in the cartesian coordinate system can be indicated by positions (r=$\alpha$, $\phi$=$\beta$) in the polar coordinate system as shown in FIG. 3. In order to carry out the image processing method of the invention it is often handy to indicate the brightness values on the basis of the position in the polar coordinate system. This is possible notably because $P_{ij}=P_{\alpha cos\beta,\alpha sin\beta}=q_{\alpha\beta}$, so that $q_{\alpha\beta}$ represents transformed brightness values on the basis of the coordinates in the polar coordinate system as shown in FIG. 2b. The transformed brightness values $q_{\alpha\beta}$ can be easily stored in an addressable memory.

Figure 4:
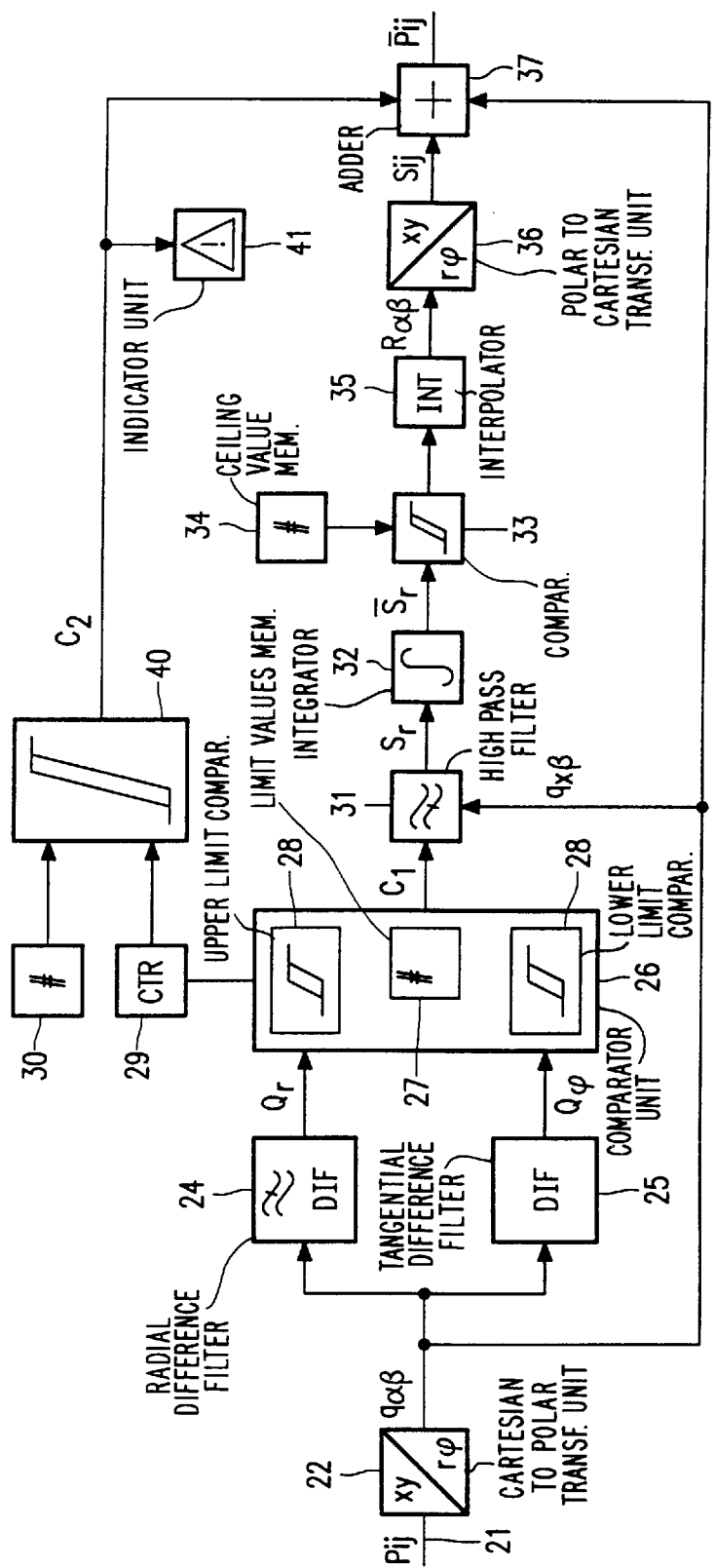
FIG. 4 shows an image processing system of a computer tomography device according to the invention.

FIG. 4 shows an image processing system of a computer tomography device according to the invention. The reconstruction unit applies the brightness values $P_{ij}$ to an input 21 of the image processing system 2. For example, the brightness values are represented by signal levels of an electronic video signal. A transformation unit 22 transforms the brightness values $P_{ij}$ in a cartesian coordinate system into brightness values $q_{\alpha\beta}$ in a polar coordinate system in the image. The transformed brightness values are applied to difference filters 24, 25 which derive components $Q_r$ and $Q_\phi$ of the variation in the radial direction and the tangential direction, respectively, from the transformed brightness values. The difference filter 24 is a low-pass difference filter which derives the low-frequency component $Q_r$ of the variation in the radial direction from the transformed brightness values $q_{\alpha\beta}$. The low-frequency radial component $Q_r$ contains variations of the brightness values over comparatively large distances in mainly the radial direction in the image. The low-frequency radial component $Q_r$ concerns mainly brightness variations in the radial direction which correspond to coarse image details of from 1 to 2 line pairs per cm. The tangential component $Q_\phi$ contains variations of the brightness values in mainly the tangential direction.

The low-frequency radial component $Q_R$ and the tangential component $Q_\phi$ are applied to a comparator unit 26 which compares the magnitude of these components with the upper limits. The upper limits are available from a memory 27. The comparator unit may comprise individual comparators 28, each of which compares the high-frequency radial component and the tangential component, respectively, with the relevant upper limit. It is alternatively possible to utilize a single comparator 28, for example for successively comparing radial low-frequency and tangential components with the relevant upper limits. The comparators 28 cooperate with a counter 29 which counts in how many positions in the image the radial and the tangential variation remain below the upper limits. The counter 29 may be coupled to the comparators or be integrated in the comparator unit 26 together with the comparators 28. The comparator unit 26 supplies a control signal $C_1$ which indicates positions in the image in which the low-frequency radial and the tangential component are below the respective upper limits. The control signal $C_1$ adjusts a high-pass filter 31 so as to derive, in as far as the low-frequency radial and tangential components are below the respective upper limits, the high-frequency radial component $S_r$ from the transformed brightness values $q_{\alpha\beta}$. The high-frequency radial component is averaged over segments of circle, that is to say over a given range of the azimuth ($\phi$). To this end, the high-frequency radial component $S_r$ is applied to an integrator 32. The integrator calculates a mean high-frequency radial component $\overline{S}_r$ by integration over respective ranges of the azimuth. Preferably, averages are calculated over eight segments of circle of 45° or sixteen segments of circle of 22.5°. The values for the deviation are calculated for individual positions in the image by interpolation of values of the mean high-frequency radial component. To this end, the image processing system is provided with an interpolator 35 which is coupled to the integrator 32.

The image processing system also includes a further comparator 33 which compares the mean high-frequency radial component $\overline{S}_r$ with the ceiling value. The ceiling value is derived from a memory 34. The comparator 33 selects values of the mean high-frequency radial component $\overline{S}_r$ which are below the ceiling value. Thus, the image information represented by comparatively high values of the mean high-frequency radial component are prevented from contributing to the correction for ring-like artefacts. The values for individual positions in the image for the deviation actually constitute an image, in polar coordinates, of the ring-like artefact with pixel values $R_{\alpha\beta}$.

This image of the ring-like artefact is backtransformed to cartesian coordinates by means of an inverse transformer 36. The inverse transformer 36 is arranged to transform the pixel values $R_{\alpha\beta}$ back to pixel values $S_{ij}$ of the ring-like artefact in the cartesian coordinate system. The inverse transformer 36 and the transformation unit 32 are arranged to perform the inverse transformation of one another. Using an adder unit 37, the pixel values $S_{ij}$ representing the ring-like artefact are added to the corresponding brightness values $P_{ij}$ of the image so as to form corrected brightness values $\overline{P}_{ij}$. The corrected brightness values are represented, for example by signal levels of an electronic video signal for the processed image. Instead of addition of brightness values and pixel values, operations other than addition can be used to form the corrected brightness values. The desired operation is dependent, for example on how exactly the radial and tangential components are formed by the difference filters 24, 25.

The counter 29 counts the number of positions in the image in which the low-frequency radial component and the tangential component are below relevant upper limits. The number of positions counted by the counter 29 is compared with the minimum value available in a memory 30. A comparator 40 compares the count with the minimum value. If the count is lower than the minimum value, the comparator 40 outputs a control signal $C_2$. The control signal $C_2$ deactivates the adder 37 if the radial and the tangential variation remain below the relevant upper limits in only a few positions in the image. If the control signal $C_2$ indicates that the number of points in which the radial and the tangential variation are below the upper limits is small, i.e. lower than said minimum value, an indicator unit 41 is activated so as to inform the user that no correction for ring-like artefacts is performed. A suitable minimum value can be empirically determined.

The functions of the image processing system can be executed equally well by means of a suitably programmed computer or a (micro-)processor with an integrated circuit conceived for that purpose. In a computer tomography device according to the invention the functions of the image processing system can also be integrated with the reconstruction unit 1.

I claim:

1. An image processing method, which comprises:

choosing a center in the image, calculating, in one or more points of the image, a variation of brightness values of the image in the radial direction relative to the center, calculating, in one or more points of the image, a variation of brightness values of the image in the tangential direction relative to the center, and deriving corrected brightness values from brightness values of the image and a deviation between the variation in the radial direction and the variation in the tangential direction, said deviation essentially not representing image information.

2. A method as claimed in claim 1, wherein the number of positions in the image for which the variation in the radial and tangential directions is below the respective upper limits is compared with a predetermined minimum number.

3. A method as claimed in claim 1, wherein for positions in the image for which low-frequency components of the variations in the radial and tangential directions are below respective upper limits said deviation is derived from the variation in the radial direction and the variation in the tangential direction.

4. A method as claimed in claim 3, wherein the number of positions in the image for which the variation in the radial and tangential directions is below the respective upper limits is compared with a predetermined minimum number.

5. A method as claimed in claim 1, wherein the derivation of the deviation for individual positions in the image includes an interpolation.

6. A method as claimed in claim 5, wherein the derivation of the deviation includes low-frequency filtering of values of said deviation in the tangential direction.

7. A method as claimed in claim 1, wherein the variation in at least one of the radial and the tangential directions is derived from a high-frequency component of the image.

8. A method as claimed in claim 7, wherein for positions in the image for which low-frequency components of the variations in the radial and tangential directions are below respective upper limits said deviation is derived from the variation in the radial direction and the variation in the tangential direction.

9. A method as claimed in claim 7, wherein the number of positions in the image for which the variation in the radial and tangential directions is below the respective upper limits is compared with a predetermined minimum number.

10. A method as claimed in claim 8, wherein the number of positions in the image for which the variation in the radial and tangential directions is below the respective upper limits is compared with a predetermined minimum number.

11. A method as claimed in claim 1, wherein for positions in the image in which the variation in the tangential direction and a low-frequency component of the variation in the radial direction are below respective upper limits said deviation is derived from a high-frequency component of the radial variation.

12. A method as claimed in claim 11, wherein said deviation is derived for positions in the image for which the high-frequency component of the radial variation is below a ceiling value.

13. A method as claimed in claim 11, wherein said deviation is derived from a value of the high-frequency component of the radial variation which has been averaged over a segment of circle in the tangential direction.

14. A method as claimed in claim 11, wherein the number of positions in the image for which the variation in the radial and tangential directions is below the respective upper limits is compared with a predetermined minimum number.

15. A method as claimed in claim 13, wherein the number of positions in the image for which the variation in the radial and tangential directions is below the respective upper limits is compared with a predetermined minimum number.

16. A method as claimed in claim 12, wherein said deviation is derived from a value of the high-frequency component of the radial variation which has been averaged over a segment of circle in the tangential direction.

17. A method as claimed in claim 12, wherein the number of positions in the image for which the variation in the radial and tangential directions is below the respective upper limits is compared with a predetermined minimum number.

18. A computer tomography device comprising a reconstruction unit for deriving brightness values of an image from density values and an image processing system for deriving corrected brightness values from the brightness values of the image, wherein the image processing system is arranged to:

choose a center in the image, calculate, in one or more points of the image, a variation of brightness values of the image in the radial direction relative to the center, calculate, in one or more points of the image, a variation of brightness values of the image in the tangential direction relative to the center, and derive corrected brightness values from brightness values of the image and a deviation between the variation in the radial direction and the variation in the tangential direction, said deviation essentially not representing image information.

19. A computer tomography device as claimed in claim 8, wherein the image processing system is arranged to derive said deviation from the variation in the radial direction and the variation in the tangential direction for positions in the image for which low-frequency components of the variation in the radial and tangential directions are below respective upper limits.

20. A computer tomography device as claimed in claim 18, wherein the image processing system is arranged to compare the number of positions in the image for which the variation in the radial and the tangential direction is below the respective upper limits with a predetermined minimum number.

* * * * *